United States Patent
Kim et al.

(10) Patent No.: US 8,921,008 B2
(45) Date of Patent: Dec. 30, 2014

(54) FUEL CELL SEPARATOR WITH GASKET AND METHOD FOR MANUFACTURING THE SAME

(75) Inventors: Sae Hoon Kim, Gyeonggi-do (KR); Sang Mun Chin, Seoul (KR); Seong Il Heo, Gyeonggi-do (KR); Suk Min Baeck, Gyeonggi-do (KR); Yoo Chang Yang, Gyeonggi-do (KR)

(73) Assignees: Kia Motors Corporation, Seoul (KR); Hyundai Motor Company, Seoul (KR)

( * ) Notice: Subject to any disclaimer, the term of this patent is extended or adjusted under 35 U.S.C. 154(b) by 91 days.

(21) Appl. No.: 13/008,259

(22) Filed: Jan. 18, 2011

(65) Prior Publication Data
US 2012/0077110 A1 Mar. 29, 2012

(30) Foreign Application Priority Data
Sep. 29, 2010 (KR) .................... 10-2010-0094053

(51) Int. Cl.
*H01M 8/00* (2006.01)
*H01M 2/08* (2006.01)
*H01M 2/14* (2006.01)
*H01M 8/02* (2006.01)

(52) U.S. Cl.
CPC .......... *H01M 8/0206* (2013.01); *H01M 8/0228* (2013.01); *Y02E 60/50* (2013.01); *H01M 8/0284* (2013.01); *H01M 8/0286* (2013.01); *H01M 8/0276* (2013.01); *H01M 8/0297* (2013.01); *H01M 8/0221* (2013.01)
USPC ............................ 429/535; 429/508; 429/511

(58) Field of Classification Search
USPC ........................... 429/35, 36, 34, 44, 400–535
See application file for complete search history.

(56) References Cited

U.S. PATENT DOCUMENTS

| | | | |
|---|---|---|---|
| 6,261,214 B1 * | 7/2001 | Meguriya | 492/56 |
| 8,084,165 B2 * | 12/2011 | Kusakabe et al. | 429/508 |
| 2003/0141672 A1 * | 7/2003 | Andou et al. | 277/628 |
| 2005/0118484 A1 * | 6/2005 | Kawachi et al. | 429/35 |
| 2006/0105221 A1 * | 5/2006 | Scherer et al. | 429/36 |
| 2007/0003821 A1 * | 1/2007 | Belchuk | 429/44 |
| 2009/0297921 A1 * | 12/2009 | Watanabe et al. | 429/34 |
| 2010/0015485 A1 | 1/2010 | Conti et al. | |

FOREIGN PATENT DOCUMENTS

| | | |
|---|---|---|
| JP | 2009-252627 A | 10/2009 |
| KR | 10-0786368 | 12/2007 |
| KR | 10-2009-0028308 | 5/2009 |

\* cited by examiner

*Primary Examiner* — Kenneth Douyette
*Assistant Examiner* — James Lee
(74) *Attorney, Agent, or Firm* — Edwards Wildman Palmer LLP; Peter F. Corless

(57) ABSTRACT

The present invention provides a fuel cell separator with a gasket and a method for manufacturing the same, which can prevent corrosion of the separator and improve corrosion resistance of the separator. In particular, the present invention provides a fuel cell separator with a gasket and a method for manufacturing the same, in which an adhesive is coated on the entire or partial surface of the separator, preferably by screen printing. A process of integrally molding a gasket to the separator is then performed such that the edges of the separator are not exposed to the outside after the injection molding process but, rather, are coated with the resin adhesive. The present invention thereby prevents corrosion of the separator, improves corrosion resistance of the separator, and prevents formation of burrs during the injection molding process.

3 Claims, 5 Drawing Sheets

<CROSS SECTION B-B>

<CROSS SECTION A-A>

FUEL CELL SEPARATOR WITH GASKET AND METHOD FOR MANUFACTURING THE SAME

CROSS-REFERENCE TO RELATED APPLICATION

This application claims under 35 U.S.C. §119(a) the benefit of Korean Patent Application No. 10-2010-0094053 filed Sep. 29, 2010, the entire contents of which are incorporated herein by reference.

BACKGROUND (a) Technical Field

The present invention relates to a fuel cell separator with a gasket. More particularly, it relates to a fuel cell separator with a gasket and a method for manufacturing the same, which can prevent corrosion of the separator and improve corrosion resistance of the separator.

(b) Background Art

Referring to FIG. 5, which shows the configuration of a fuel cell stack based on a unit cell, a membrane electrode assembly (MEA) is located in the middle of the fuel cell stack and includes a polymer electrolyte membrane 10 and an electrode/catalyst layer such as an air electrode (cathode) 12 and a fuel electrode (anode) 14 disposed on each of both sides of the polymer electrolyte membrane 10. Hydrogen ions (protons) are transported through the polymer electrolyte membrane 10, and an electrochemical reaction between hydrogen and oxygen takes place in the electrode/catalyst layer.

A gas diffusion layer (GDL) 16 and a gasket 18 are sequentially stacked on both sides of the MEA, where the cathode 12 and the anode 14 are located. A separator 20 including flow fields for supplying fuel and discharging water generated by the reaction is located on the outside of the GDL 16, and an end plate 30 for supporting and fixing the above-described components is connected to each of both ends thereof.

At the anode 14 of the fuel cell stack, hydrogen is dissociated into hydrogen ions (protons, $H^+$) and electrons ($e^-$) by an oxidation reaction of hydrogen. The hydrogen ions and electrons are transmitted to the cathode 12 through the electrolyte membrane 10 and the separator 20, respectively. At the cathode 12, water is produced by an electrochemical reaction in which the hydrogen ions and electrons transmitted from the anode 14 and the oxygen in air participate and, at the same time, electrical energy is produced by the flow of electrons.

The separator 20 (for example, a metal separator) of the fuel cell stack functions as follows.

The separator 20 acts as a path for supplying a reducing gas and an oxidizing gas to the cells, a path for supplying coolant for cooling the fuel cell stack, and a path for transmitting the generated current. Thus, the separator 20 should be air-tight and liquid-tight such that the reducing gas, the oxidizing gas, and the coolant are not mixed together. Therefore, a rubber sealing material can be applied to the surface of the separator 20 to maintain the air-tightness and liquid-tightness and, at the same time, serve to maintain the load.

Moreover, the gasket 18 of the fuel cell stack is bonded to the separator 20 to define each of the unit cells of the fuel cell stack and to serve to seal the hydrogen, coolant, and air flow fields, respectively, formed on the surface of the separator 20. Therefore, for smooth functioning of the gasket 18, the method of bonding the gasket 18 to the separator 20 and the selection of a gasket base material should be carefully considered during manufacturing of the fuel cell stack.

A conventional method of integrally bonding a gasket 18 to a separator 20 in consideration of these factors will be described with reference to FIGS. 3 and 4 below.

First, as shown in FIG. 3, an adhesive is coated on a portion of the surface of a metal separator 20 (hereinafter referred to as a separator), on which a gasket 18 is injection molded, and the edges of the separator 20 are fixed by the pressure of an injection mold 40. Then, a gasket base material is injected into the injection mold 40 and, at the same time, the injection mold 40 applies a pressure to the gasket 18 to be integrally molded on the surface of the separator 20.

Referring to FIG. 4 showing the structure of the separator on which the gasket is integrally molded, the gasket 18 is not formed on the edges of the separator 20, and thus the surface of the edges of the separator 20, on which the gasket 18 is not formed, is always exposed to the outside.

The reason that the gasket is not formed on the edges of the separator is that the edges of the separator are in close contact with the injection mold and clamped by the injection mold when the gasket is integrally molded on the separator.

While the gasket is not formed on the edges of the separator, this does not have a significant effect on the air-tightness performance. However, as the edges of the separator are always exposed to corrosive environments in the cells of the fuel cell stack, corrosion occurs over time, which results in a reduction in durability of the separator.

Moreover, in the case where there is a slight difference in thickness in the longitudinal direction of the edges of the separator, the force of the injection mold including upper and lower mold to clamp the edges of the separator is not uniformly applied, which results in the formation of burrs on the surface of the gasket. Therefore, a finishing process for removing the burrs is required, which reduces the efficiency of the injection molding process.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art. The present invention provides a fuel cell separator with a gasket and a method for manufacturing the same. In particular, the present invention provides a fuel cell separator in which a resin adhesive is coated on the entire or at least a portion of the surface of a separator by suitable methods, such as screen printing. A process of integrally molding a gasket to the separator is performed such that the edges of the separator are not exposed to the outside after the injection molding process but, rather, are coated with the resin adhesive, thereby preventing corrosion of the separator, improving corrosion resistance of the separator. As such, the formation of burrs during the injection molding process is prevented.

In one aspect, the present invention provides a fuel cell separator on which a gasket is integrally molded, the separator including an adhesive coated on a surface of the separator where the gasket is to be injection molded, and an adhesive coated on a surface of the edges of the separator. In certain embodiments, the adhesive is coated by screen printing, and may be referred to as "screen adhesive", however, any other known methods for applying an adhesive coating could also be used.

In a preferred embodiment, the adhesive, which may be a screen adhesive, may be coated on upper and lower surfaces at the edges of the separator.

In another preferred embodiment, the adhesive, which may be a screen adhesive, may be coated on upper and lower surfaces and sides at the edges of the separator.

In another aspect, the present invention provides a method for manufacturing a fuel cell separator, the method including: coating an adhesive on a surface of a separator, the adhesive being coated where a gasket is to be injection molded, and further being coated on a surface of the edges of the separator; allowing the adhesive coated on the edges of the separator to absorb pressing force of an injection mold when the injection mold clamps the edges of the separator by applying a pressure; and injecting a gasket base material into a cavity of the injection mold such that the gasket is integrally molded on the surface of the separator. In some embodiments, the adhesive is a screen adhesive.

In a preferred embodiment, the adhesive, which may be a screen adhesive, may be the same base material as the gasket base material. The gasket base material may be selected from any known gasket base materials such as, but not limited to, a fluorine rubber, a polymer resin, and a liquid silicone resin (LSR).

In another preferred embodiment, the adhesive, which may be a screen adhesive, may be applied in a thickness of about 10 to 100 μm.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
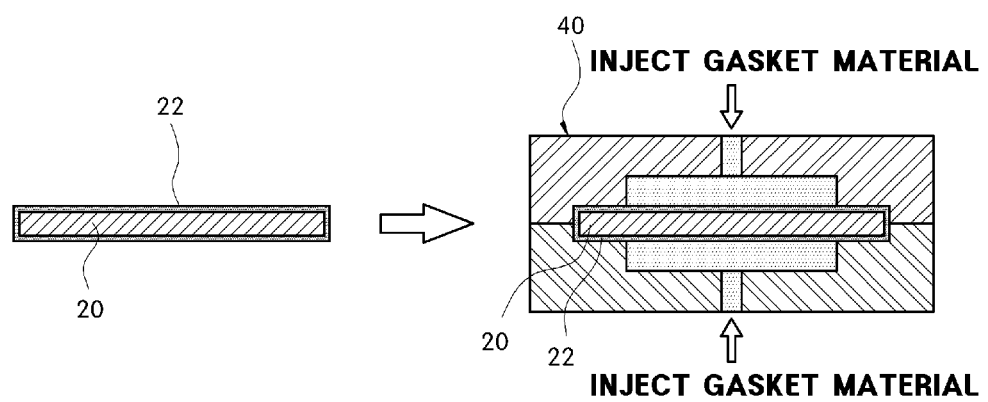
FIG. 1 is a schematic diagram showing a method for manufacturing a fuel cell separator in accordance with a preferred embodiment of the present invention.

Reference numerals set forth in the Drawings includes reference to the following elements as further discussed below:

10: polymer electrolyte membrane
12: air electrode
14: fuel electrode
16: gas diffusion layer (GDL)
18: gasket
20: separator
22: screen adhesive
30: end plate
40: injection mold It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description are not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a fuel cell separator with a gasket and a method for manufacturing the same. In particular, the present invention provides a fuel cell separator with a gasket wherein an adhesive, for example a screen adhesive, for bonding the gasket is coated on the entire or at least a portion of the surface of a separator by a suitable coating method, such as screen printing. A process of integrally molding the gasket to the separator is performed such that the edges of the separator are not exposed to the outside after the injection molding process but, rather, are coated with the adhesive. The present invention prevents corrosion of the separator even when the separator is exposed to corrosive environments in a fuel cell stack, prevents the formation of burrs during the injection molding process, and improves productivity.

It is noted that while the adhesive may be described in various embodiments as being applied through screen printing and, thus, referred to as a "screen adhesive", it is understood that the adhesive can be formed using any suitable coating method. As such, while referred to herein as a "screen adhesive" in various embodiments, the adhesive is not limited to only screen adhesives.

According to an embodiment of the present invention, as shown in FIG. 1, prior to an injection molding process, a screen adhesive 22 is coated on a desired portion of a separator 20, i.e., the surface of the separator 20 on which a gasket is to be injection molded, and is also coated on the surface of the edges of the separator 20. Here, the screen adhesive 22 which is coated on the surface where the gasket is to be injection molded and the screen adhesive which is coated on the surface of the edges of the separator 20 may be the same base material as the gasket base material. Preferably, the screen adhesive 22 may be one selected from the group consisting of a fluorine rubber, a polymer resin (primer), and a liquid silicone resin (LSR) and may be applied in a thickness of about 10 to 100 μm.

According to various embodiments, the screen adhesive 22 is coated on the upper and lower surfaces at the edges of the separator 20, which are pressed by an injection mold 40.

Preferably, the screen adhesive 22 is applied to all of the upper and lower surfaces and the sides at the edges of the separator 20 such that the metal surface at the edges of the separator 20 is not exposed to the outside.

Next, the separator 20 coated with the screen adhesive 22 is placed on a lower mold of the injection mold 40 and then an upper mold of the injection mold 40 is placed thereon such that the edges of the separator 20 are tightened and clamped by the injection mold 40.

At this time, when the injection mold 40 clamps the edges of the separator 20 by applying a pressure, the pressing force of the injection mold 40 is absorbed by the screen adhesive 22 coated on the edges of the separator 20.

Conventionally, in the case where there is a slight difference in thickness in the longitudinal direction of the edges of the separator when the upper and lower molds of the injection mold are in direct contact with the edges of the separator (i.e., the portion where the metal surface is exposed to the outside) to clamp the edges of the separator, burrs are formed on the edges of the separator by the friction due to the pressure of the injection mold.

However, according to the present invention, since the edges of the separator 20 clamped by the upper and lower mold of the injection mold 40 are coated with the screen adhesive 22, the pressing force of the injection mold 40 is absorbed by the screen adhesive 22 coated on the edges of the separator 20, thereby preventing the formation of burrs.

In particular, when using conventional methods, the burrs are formed on the gasket by the difference in thickness of the separator material during the injection molding process, and thereby the gasket base material is squeezed out (i.e., protrudes) from a gap between the separator and the injection mold. The burrs may be introduced into the reaction area of the separator to clog the flow fields of the separator and may be separated from the gasket after a long term operation to cut off the supply of reactant gases and coolant. Therefore, the conventional method requires a finishing process for removing the burrs. However, according to the present invention, since the edges of the separator 20 are coated with the screen adhesive 22, the pressing force of the injection mold 40 is absorbed by the screen adhesive 22 coated on the edges of the separator 20, thereby preventing the formation of burrs.

Next, a gasket base material is injected into a cavity of the injection mold 40 such that the gasket 18 is integrally molded on the surface of the separator 20 by the pressure of the injection mold 40. The injection mold 40 is then removed to yield the final product.

Figure 2:
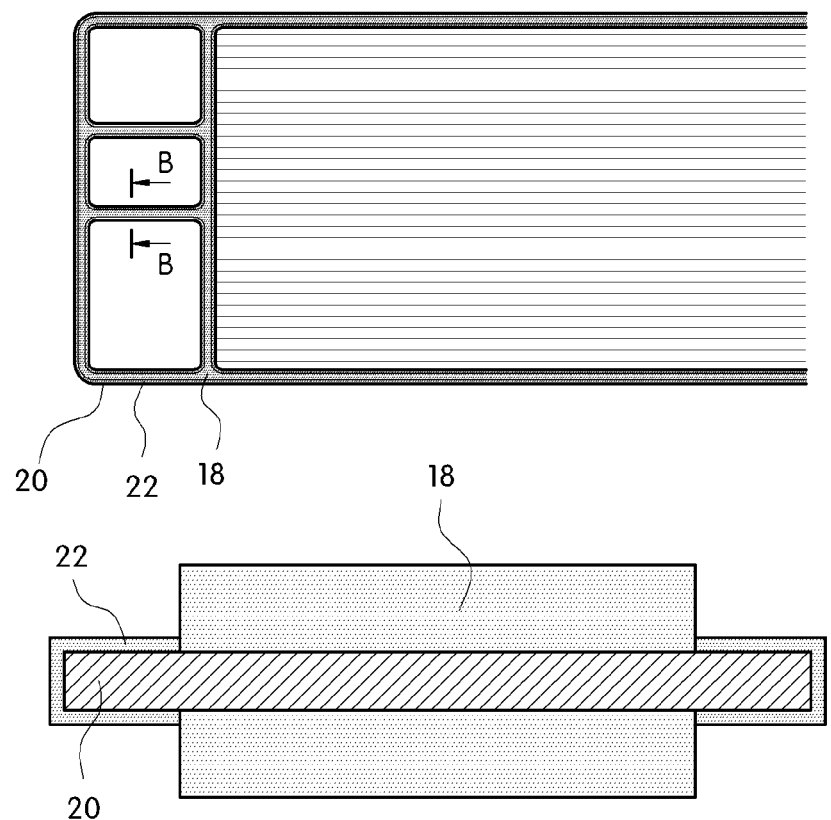
FIG. 2 is a plan view showing a fuel cell separator with a gasket in accordance with another preferred embodiment of the present invention.
Figure 3:
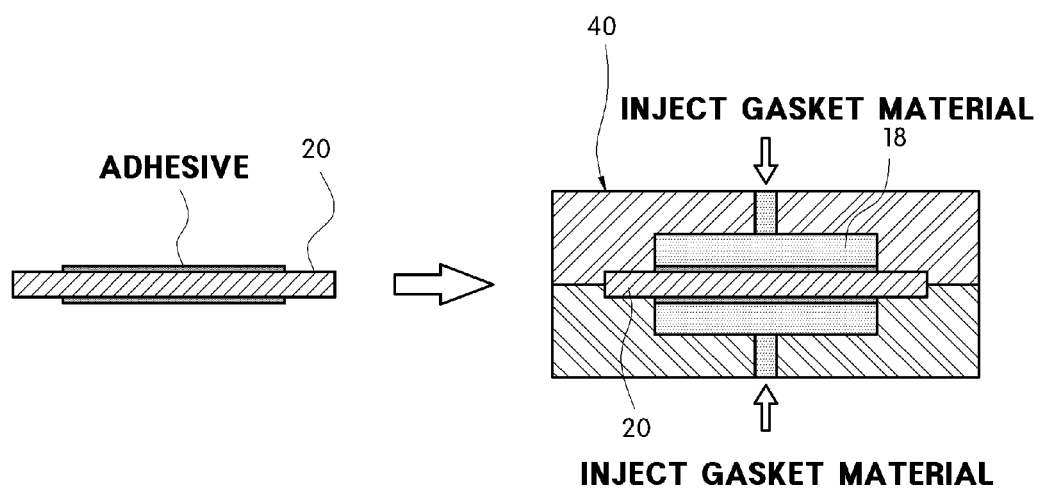
FIG. 3 is a schematic diagram showing a conventional method for manufacturing a fuel cell separator.
Figure 4:
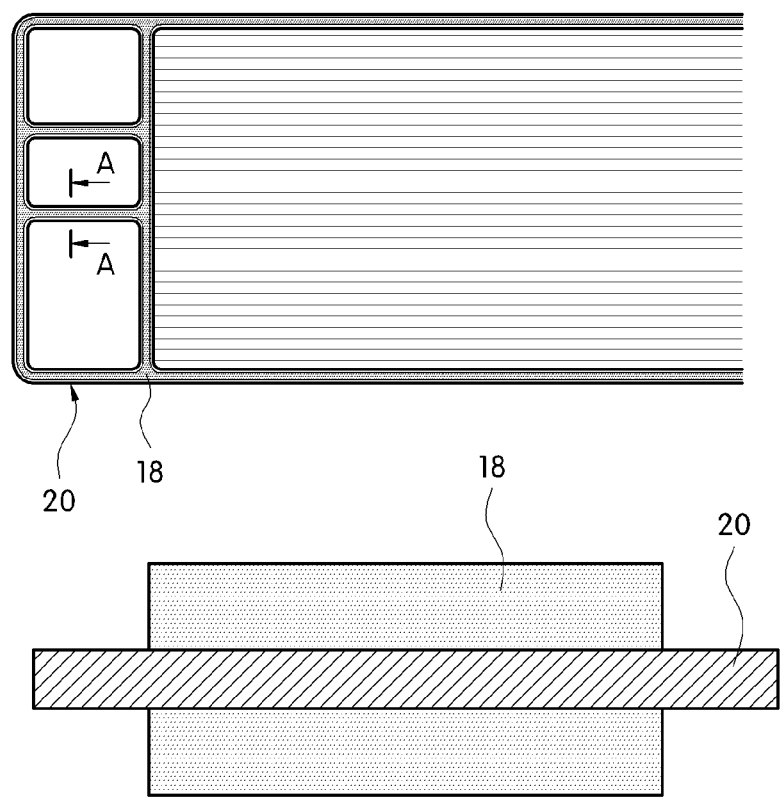
FIG. 4 is a plan view showing a conventional fuel cell separator with a gasket.
Figure 5:
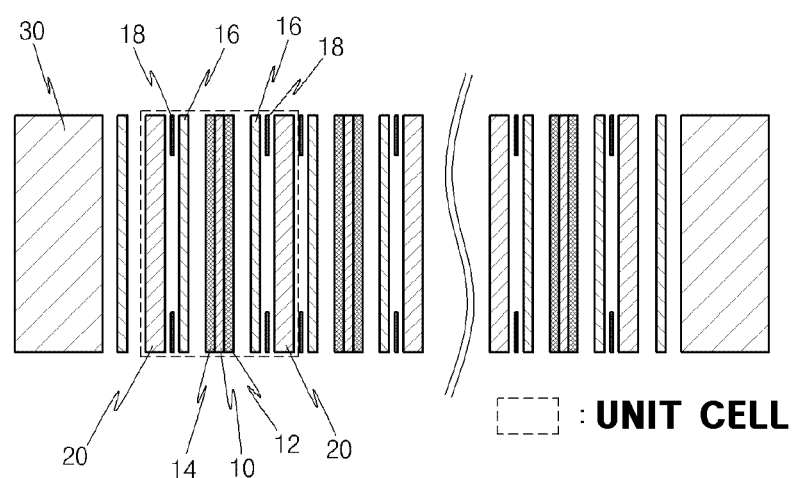
FIG. 5 is a schematic diagram showing the configuration of a typical fuel cell stack.

Referring to FIG. 2 which shows the structure of the thus formed fuel cell separator with the gasket in accordance with the present invention, the gasket 18 is integrally molded on the surface of the separator 20 and, at the same time, the screen adhesive 22 is coated on the edges of the separator 20 such that the metal surface at the edges of the separator 20 is not exposed to the outside.

Therefore, even if the edges of the separator 20 are exposed to corrosive environments during operation of the fuel cell stack, the edges of the separator 20 are covered with the screen adhesive 22, i.e., physically isolated from the corrosive environments in the fuel cell stack, and thus it is possible to prevent corrosion of the edges of the separator 20.

As described above, the fuel cell separator with the gasket and the method for manufacturing the same according to the present invention provide the following effects.

According to the present invention, the adhesive (e.g. rubber or resin adhesive) is coated on the surface of the separator where the gasket is injection molded, and is further coated on the surface of the edges of the separator, such as by screen printing. Then, the process of integrally molding the gasket to the separator is performed such that the edges of the separator are not exposed to the outside after the injection molding process but, rather, are coated with the resin adhesive. As such, corrosion of the separator can be prevented even if the separator is exposed to the corrosive environments in the fuel cell stack.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a fuel cell separator, the method comprising:

coating an adhesive on an entire first surface of a separator, as well as an entire second surface of the edges of the separator wherein the first surface includes the entire separator other than a reaction area of the separator and the edges of the separator, and the second surface includes the edges of the separator;

once an adhesive is coated on the entire first surface and the entire second surface of the separator, disposing the separator within an injection mold and allowing the adhesive coated on the edges of the separator to absorb pressing force of the injection mold when the injection mold clamps the edges of the separator by applying a pressure; and injecting a gasket material into a cavity of the injection mold to form the gasket such that the gasket is integrally molded with the adhesive coated on the first surface of the separator wherein once the gasket material is injection molded, the gasket and the adhesive are integrally molded on the first surface of the separator, wherein the adhesive is the same base material as the gasket base material that is injected into the cavity, and wherein coating an adhesive includes screen printing the adhesive.

2. The method of claim 1 wherein the adhesive base material and the gasket base material are selected from the group consisting of a fluorine rubber, a polymer resin, or a liquid silicone resin (LSR).

3. The method of claim 1, wherein the adhesive is applied in a thickness of about 10 to 100 μm.

* * * * *